(No Model.) 9 Sheets—Sheet 1.

J. COMSTOCK & T. E. JEFFERSON.
PROCESS OF AND APPARATUS FOR THE UTILIZATION OF PRODUCTS OF COMBUSTION.

No. 261,081. Patented July 11, 1882.

Fig. 1.

WITNESSES:
Fred. G. Dieterich.
H. Clay Smith.

INVENTORS
John Comstock
Thos. E. Jefferson
ATTORNEYS.

N. PETERS, Photo-Lithographer, Washington, D. C.

(No Model.) 9 Sheets—Sheet 4.

J. COMSTOCK & T. E. JEFFERSON.
PROCESS OF AND APPARATUS FOR THE UTILIZATION OF PRODUCTS OF COMBUSTION.

No. 261,081. Patented July 11, 1882.

WITNESSES:

INVENTORS
John Comstock
Thos. E. Jefferson
ATTORNEYS

(No Model.) 9 Sheets—Sheet 5.

J. COMSTOCK & T. E. JEFFERSON.
PROCESS OF AND APPARATUS FOR THE UTILIZATION OF PRODUCTS OF COMBUSTION.

No. 261,081. Patented July 11, 1882.

WITNESSES:

INVENTORS'
John Comstock
Thomas E. Jefferson
ATTORNEYS.

(No Model.) 9 Sheets—Sheet 6.

J. COMSTOCK & T. E. JEFFERSON.
PROCESS OF AND APPARATUS FOR THE UTILIZATION OF PRODUCTS OF COMBUSTION.

No. 261,081. Patented July 11, 1882.

WITNESSES:
INVENTORS
ATTORNEYS.

(No Model.) 9 Sheets—Sheet 7.
J. COMSTOCK & T. E. JEFFERSON.
PROCESS OF AND APPARATUS FOR THE UTILIZATION OF PRODUCTS OF COMBUSTION.
No. 261,081. Patented July 11, 1882.

WITNESSES:
INVENTORS (No Model.) 9 Sheets—Sheet 8.

J. COMSTOCK & T. E. JEFFERSON.
PROCESS OF AND APPARATUS FOR THE UTILIZATION OF PRODUCTS OF COMBUSTION.

No. 261,081. Patented July 11, 1882.

WITNESSES:
Fred. G. Dieterich
H. Clay Smith

INVENTORS
John Comstock
Thos. E. Jefferson
ATTORNEYS.

(No Model.) 9 Sheets—Sheet 9.

J. COMSTOCK & T. E. JEFFERSON.
PROCESS OF AND APPARATUS FOR THE UTILIZATION OF PRODUCTS OF COMBUSTION.

No. 261,081. Patented July 11, 1882.

WITNESSES:
Fred. G. Dieterich
H. Clay Smith

INVENTORS
John Comstock
Thomas E. Jefferson
ATTORNEYS.

UNITED STATES PATENT OFFICE.

JOHN COMSTOCK, OF HUDSON, WISCONSIN, AND THOMAS E. JEFFERSON, OF BOSTON, MASSACHUSETTS.

PROCESS OF AND APPARATUS FOR THE UTILIZATION OF PRODUCTS OF COMBUSTION.

SPECIFICATION forming part of Letters Patent No. 261,081, dated July 11, 1882.

Application filed May 23, 1882. (No model.)

*To all whom it may concern:*

Be it known that we, JOHN COMSTOCK, of Hudson, St. Croix county, Wisconsin, and THOMAS E. JEFFERSON, of Boston, Massachusetts, citizens of the United States, have invented certain new and useful Improvements in Process of and Apparatus for the Utilization of Products of Combustion; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to an improved method and means for utilizing all the heat arising from the combustion of fuel in furnaces, stoves, and the like; for inducing a constant and powerful draft, susceptible of modification at will, in such fuel-consuming devices; for eliminating the smoke, soot, and other carbonic products of combustion from the immediate atmosphere of a city or district by conducting them to a sewer or other main, and thence to a point away from such district; for utilizing such carbonic products of combustion to deodorize, disinfect, and dilute sewer-gas, and for accelerating the removal of said commingled gases; and the novelty consists in the manner and means which will be hereinafter more fully set forth, and specifically pointed out in the claims.

The object of the first part of our invention is to utilize all the heat arising from the combustion of fuel; and to this end the invention consists essentially in conveying the products of combustion by proper connecting tubes or pipes or other means from the place where it is generated through a series of other stoves, drums, coils, radiators, baths, closets, tanks, &c., arranged in such a manner that the device requiring the more intense heat shall or may be located nearest the generating-furnace, and in connecting the last device of this series with the sewer or other main, in order that any surplus heat may be utilized to prevent freezing therein. A branch pipe may lead from the connecting tube or flue upon one side of either or all of these devices to the same flue upon the other side, and proper cocks be arranged so that the heat, &c., may be directed past one or more of said devices, and the flue may be covered with any suitable nonconductor to prevent loss of caloric. Each device is preferably provided with a register by means of which the heat, &c., may be diluted at will, and such registers serve as ventilators in warm weather, when heat is not required, to eliminate contaminated air from apartments, buildings, &c.

The second part of our invention has for its object to induce a continuous and powerful draft in such fuel-consuming devices, thus greatly facilitating the kindling of fires, the ventilation of the buildings or apartments wherein such devices are located, and preventing a return-flow of smoke, &c.; and to subserve this purpose the invention consists essentially in inducing a continuous and powerful current of air in the sewer or other main in the direction of its exit by means of power-fans or air-pumps, thereby creating within the sewer or other main a partial vacuum, which the said products of combustion rush to fill. Suitable registers or dampers upon each fuel-consuming furnace or stove allow the modification of such draft at will.

The object of the third part of our invention is not only to prevent a return-flow of smoke and gas arising from the combustion of fuel, but to absolutely remove from the buildings and streets of a city or district all the smoke, soot, and gases thus generated therein; and to accomplish this result the invention provides that all such gas, smoke, and soot forming devices shall connect with a sewer or other main common to all such fuel-consuming devices in which such gases, smoke, &c., shall be drawn, and that from such main they shall be forced with accelerated speed to the conduit-exit by means of a power-fan or air-pump, as will be shown.

The fourth part of our invention has for its object to utilize the carbonic products of combustion to deodorize, disinfect, and dilute the poisonous sewer-vapors, and to accelerate the elimination of the thus commingled gases; and to this end the invention consists in bringing such gases together within the sewer by means of the partial vacuum made therein by the power-fan or pump, and by the same means hastening their removal beyond the inhabited portion of the district.

The invention in many of its details is fully illustrated in the accompanying drawings, which form a part of this specification, and in which—

Fig. 6, a section showing fuel-consuming stove connected with a sewer or other main, a draft-regulator within the connecting-flue, a check-valve to prevent a return-flow of the products of combustion, and draft-inciting means connecting the said main with a chimney. Figs. $6^a$, $6^b$ are enlarged detail views of the connecting-flues, showing the draft-regulating and return-preventing devices in dotted lines.

Referring to the drawings, in which similar letters of reference indicate like parts in all the figures, A represents the sewer, and B a furnace or other fuel-consuming device.

Figure 1:
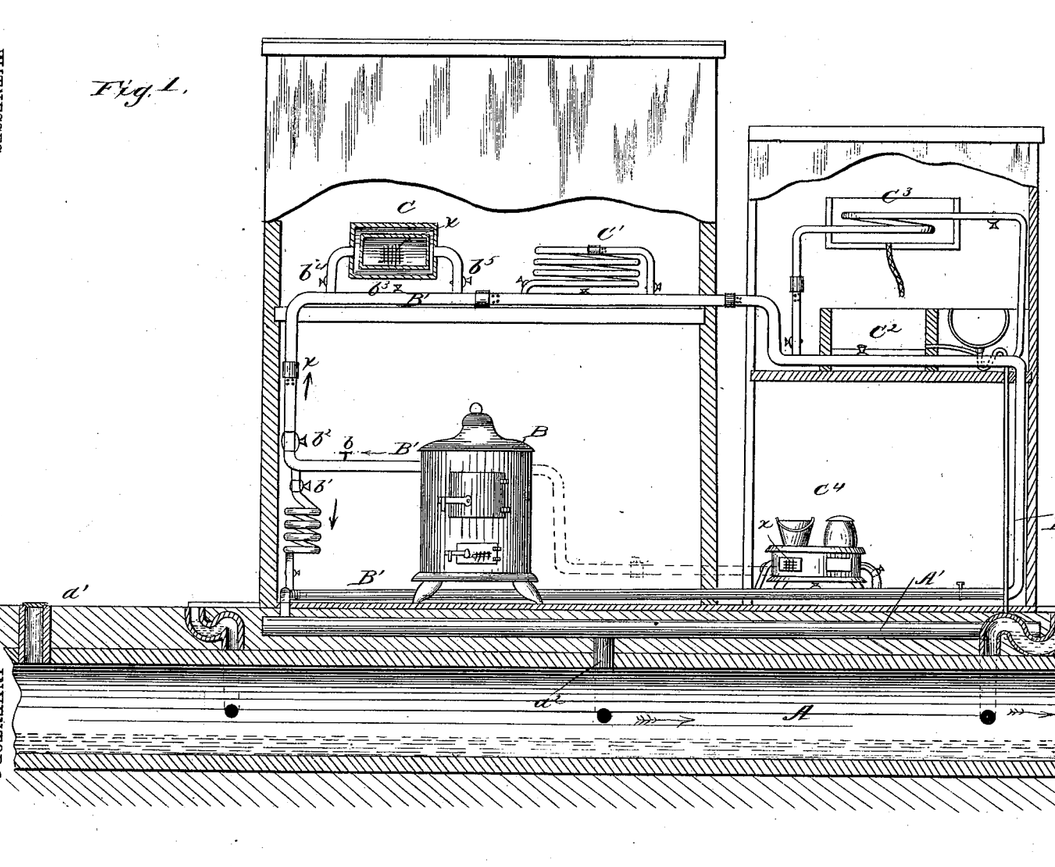
Figure 1 represents a sectional elevation of our invention, showing the fuel-consuming device, the series of heat-utilizing devices connected together by the house-pipe connected therewith, the ventilators or registers, and the cocks for deflecting the current of smoke and gas.

As represented in Fig. 1, B' represents a flue leading from said furnace, provided with cocks $b\ b'\ b^2$, as shown—the former cock to cut off the flow of smoke, &c., entirely, and the two latter adapted to deflect the same up or down, as may be desired. If the products of combustion are deflected downward by the closing of the cock $b^2$, they pass into the auxiliary main or house-drain A', and thence into the sewer, or into the sewer A direct. If the same be directed upward by closing the cock $b'$, they may be directed through one or more of the heat-utilizing devices shown by shutting of the cock $b^3$ and opening cocks $b^4$ and $b^5$; or they may pass through the conductor B' by reversing the position of said cocks. As shown, this conductor or flue B' connects thus with an oven, C, a heating-coil, C', a tank, $C^2$ or $C^3$, with a closet, along water-service pipes, to prevent freezing in extreme weather, with a stove, $C^4$, and with the house-drain or sewer or other main. A still further deflection is provided for by closing the cock $b$, which directs the products of combustion into a stove in another building, (shown as in use for culinary purposes.) Each of this series of devices is provided with a register, by means of which the temperature may be adjusted, and ventilators $x$ allow the dilution of gases at will.

Figure 7:
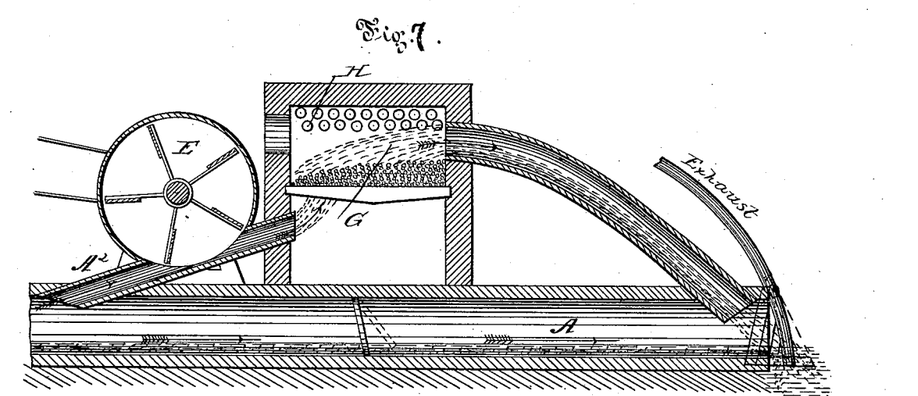
Fig. 7 is a vertical horizontal section, showing the commingled sewer-gas and products of combustion utilized as fuel to generate the steam employed as a power to operate the suction device.
Figure 8:
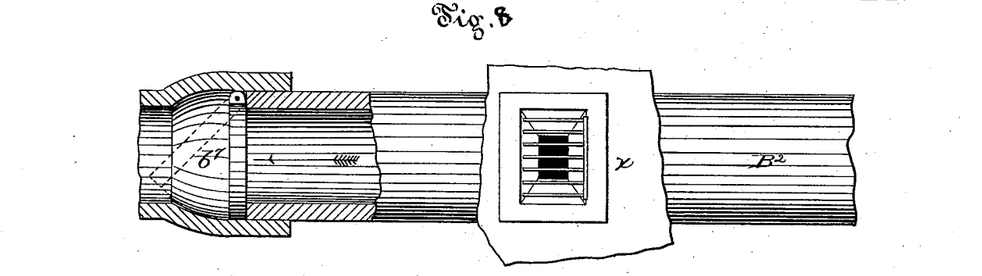
Figs. 8 and 9 are similar views of modifications.
Figure 9:
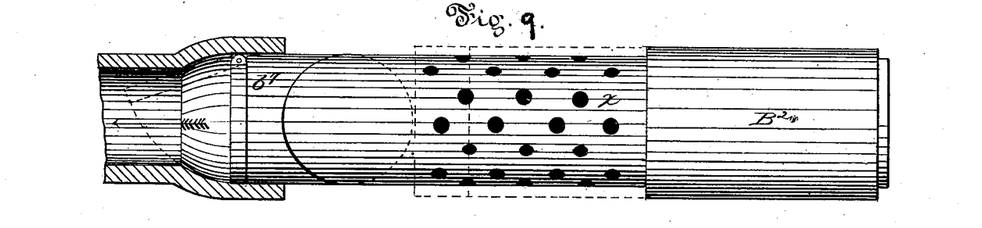

It is obvious that the degree of heat diminishes in proportion to its distance from the furnace, and for this reason the peculiar devices requiring the more intense heat may be located nearest said furnace. The surplus heat, if any, after leaving closets and along water-service pipes, may be directed into the sewer or drains, where it is utilized to prevent freezing therein. This utilization of the entire heat arising from combustion of fuel is important in any sense, but its importance is enhanced in this system by reason of it saving the greater part, and that portion which has heretofore been allowed to go to waste. This system, however, contemplates still greater advantages and results. The direction of the products of combustion into the sewer does away with the smoke, gas, and soot which becloud a town or district, especially in manufacturing-towns. In our system we employ, near the outlet of the sewer or other main, a powerful fan, air-pump, or screw, E, which creates a powerful and continuous current of air in the direction of the sewer-outlet, a sufficient draft in the stoves or furnaces, insures the suction of all the smoke, soot, and gases into the sewer or other main, prevents smoking stoves, &c., (from defective chimneys,) and disinfects, dilutes, and deodorizes the sewer-gas. The smoke and commingled gases are inflammable, and by this system they are drawn away from the inhabited portion of the city or district, and cleansed, burned, or discharged, as may be desired. In Fig. 7 we show them passed through a furnace, G, where they serve as fuel to generate the steam in the boiler H, which acts as the motive power to the fan which impels them.

Figures 2, 3, 4:
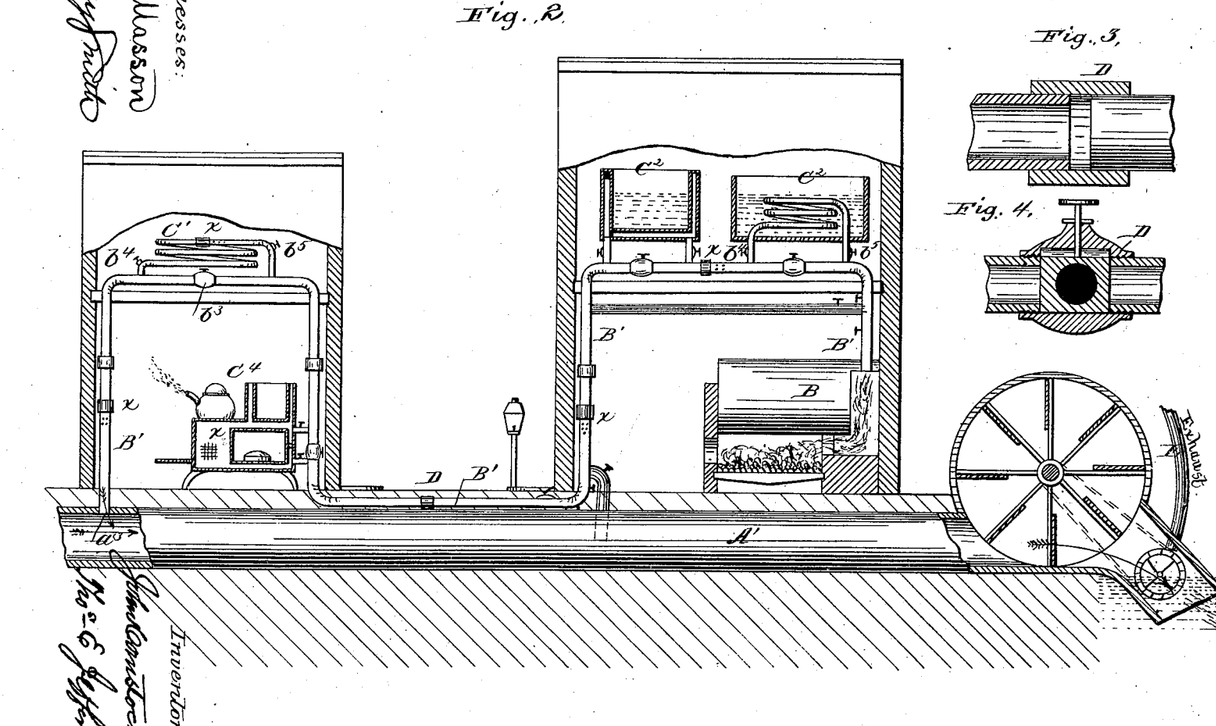
Fig. 2, a similar view, showing a boiler-furnace connected with a similar series of heat-utilizing devices upon both sides of a street, and the products of combustion led into a main, also a means for inducing a draft in said main.
Fig. 3 represents an expansible joint adapted to join sections of the flue-pipe, and to accommodate contraction and expansion due to heat and cold.
Fig. 4, an enlarged view of a pipe-valve.

In Fig. 2 is shown an approximately similar arrangement, except that the products of combustion are carried across a street and utilized upon both sides. In that figure, B is the furnace; B', the conductor or flue; D, the expansible connecting-coupling; $x\ x$, the ventilators, and $a^3$ the outlet into the main A', the outlet from which is shown under the surface of water, where the gases are forced by the fan E and agitated by the wheel under force of the exhaust-steam.

Figures 6, 6A, 6B:
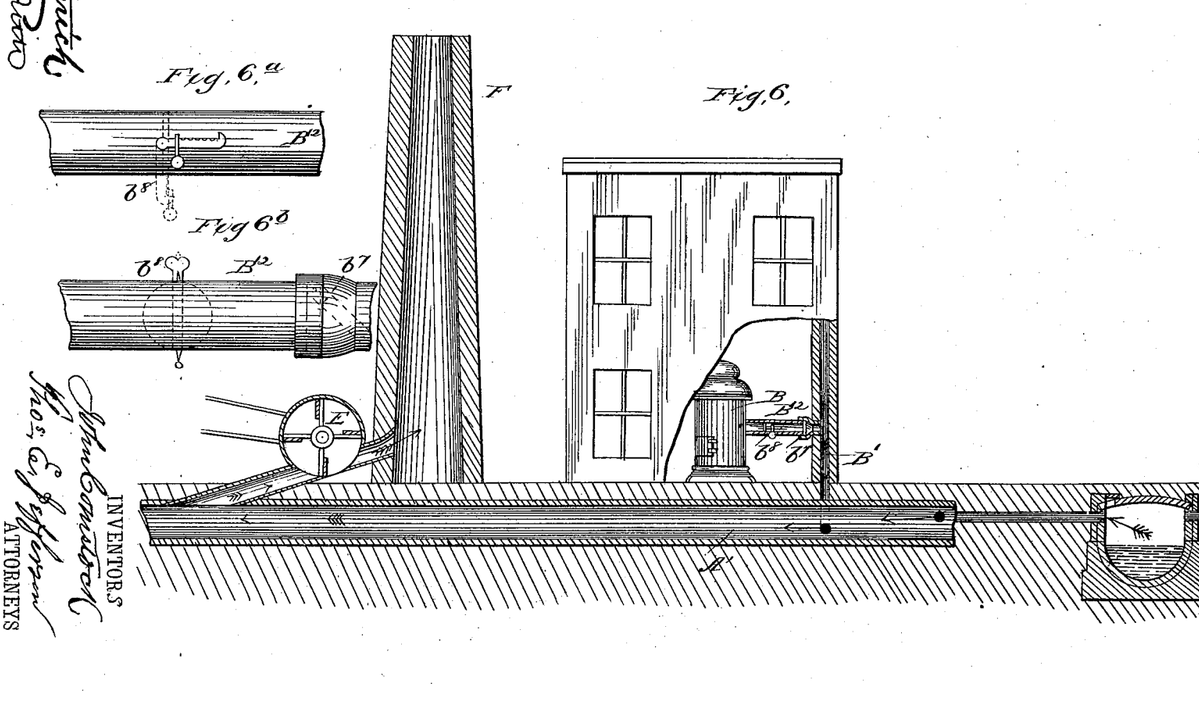

We provide for preventing any return-flow from the sewer or connections, as shown in Figs. 6, $6^a$, $6^b$, 8, and 9, in which the tube $B^{12}$, which connects the furnace B with the flue B', is provided with a check-valve, $b^7$, for that purpose, while a gage or damper, $b^8$, allows the ready adjustment of the draft at will.

As heretofore constructed, buildings have often from defective chimneys, imperfect drafts, and the like been subjected to backflows of smoke, gas, &c., owing to the fact that the draft obtained had to be incited by the heat generated from combustion, such heat then being allowed to go to waste up the chimney. In any event heat as a draft-inciting means could not draw the products of combustion downward toward an exit to advantage, while in our invention, by reason of the continuous and powerful draft, the products of combustion may be readily directed, deflected, or modified at will, and their flow, both in volume and intensity, be under the absolute control of the house inhabitants.

We are aware that in steam-generation a draft-inciting mechanism has been suggested for the purpose of multiplying heating tubular surface in a boiler, and that a fan has been employed to force products of combustion through different chambers of brick-kilns and through vessels of water; but these suggestions never contemplated more than the simple economy of heat for these specific purposes, and do not bear with any force upon the system of utilization herein set forth, a prominent and important feature of which is to carry the disagreeable and injurious portions of the products of combustion—such as smoke, soot, &c.—away from the inhabitants of a city or town, and to utilize the heat contained in the products of combustion while in the act of thus eliminating the said injurious qualities. In other words, we practically utilize the useful portion of the products, and at the same time, by the same means and the same method, remove the injurious portion to such place as will render it comparatively harmless.

Where soft coal is used in the fuel of a city or district, involving the production of large quantities of smoke and oily soot, the drawn-off products may be consumed and utilized as fuel, as shown in Fig. 7, or discharged below the surface of water, or subjected to water-spray. If soot is discharged upon the surface of water, it will float, but if below the surface it will sink, and the latter method may be employed for the elimination of said soot, as shown in Figs. 11, 2, 10, and 7.

Figure 12:
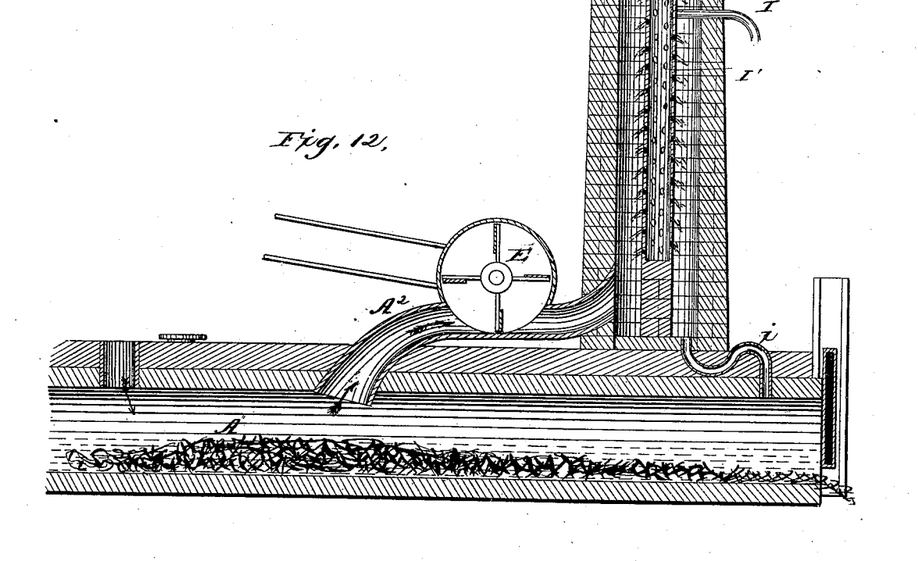
Figs. 12 and 13 are sectional views, showing means for washing the smoke, gases, &c.; and Figs, 14, 15, and 16 are detail sections of the portions of the sewer near its outlet.
Figure 13:
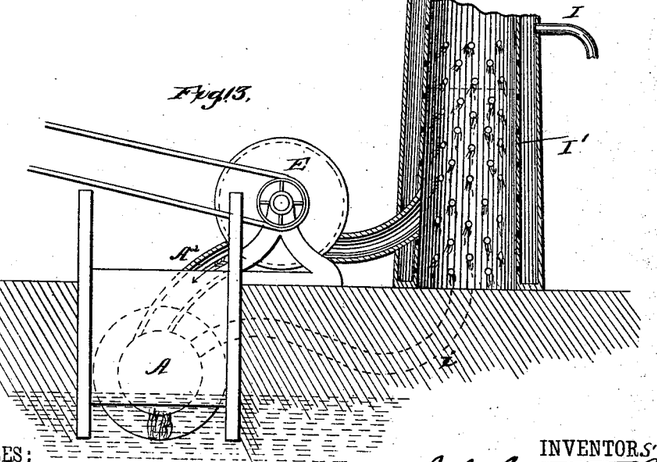
Figures 14, 16:
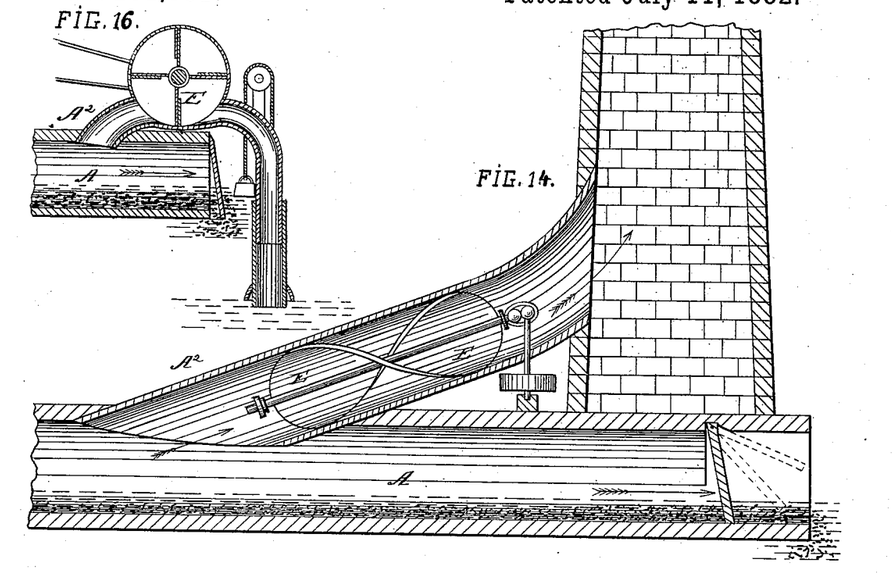
Figure 15:
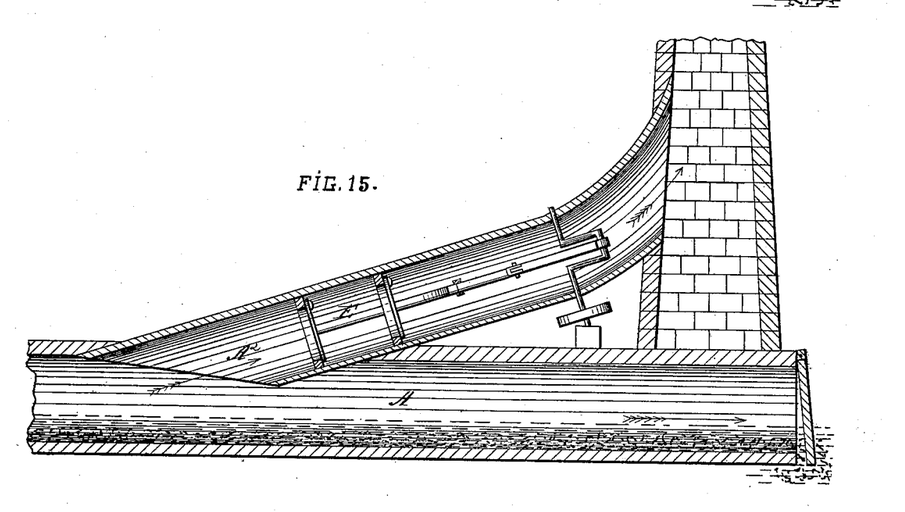

In Figs. 12 and 13 we show a means for washing the gases, smoke, soot, &c. In Fig. 12, $A^2$ represents a branch from the main sewer A, in which is located the fan E, which serves to force the commingled gases upward in a chimney around a perforated cylinder, I', with the interior of which is connected a water-feeding pipe, I. The water thus injected into the cylinder I' passes through the small perforations therein, and in its descent meets the ascending gases, &c., and tends to wash out of said gas, &c., the soot, oil, &c., which, with the water, gravitate through the pipe $i$ into the sewer A. In Fig. 13 the operation is similar, except that the gases pass up the interior of the perforated cylinder and the water passes through the perforations from the outside thereof.

Figure 5:
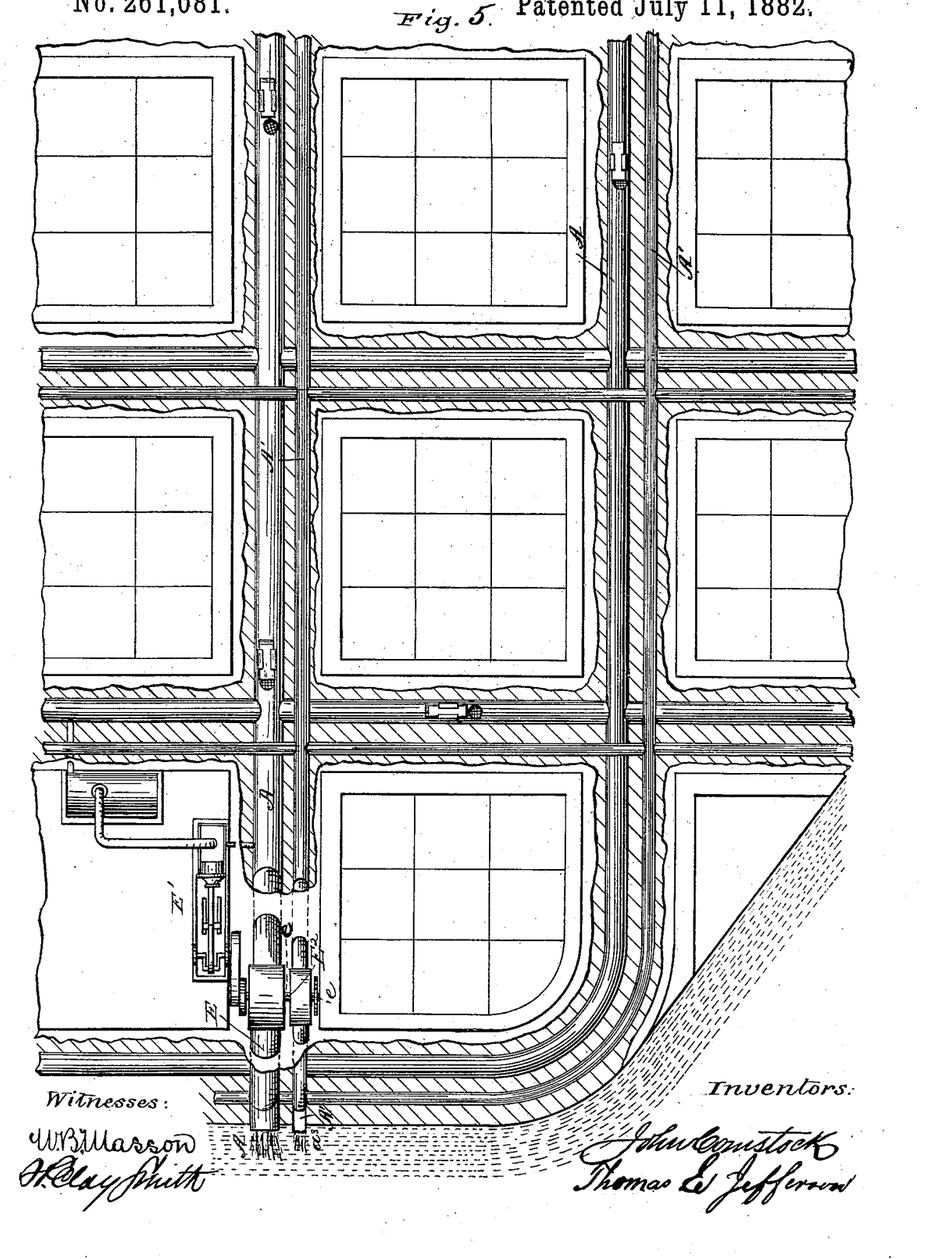
Fig. 5, a district of a city or town laid out in squares, showing a sewer-main for sewage, smoke, gas, &c., and an auxiliary sewer or main for the impure air and gases, connected at different points, if desired, and a means for inciting a partial vacuum in each.

In Fig. 5 we show a sewer-main, A, and an adjacent conductor, A', the former being adapted to serve as a channel for the elimination and commingling of sewer-gas and products of combustion, and the latter as a channel for the ventilation of apartments and buildings, and a suction, E $E^2$, for each main, respectively, both being hung upon a single shaft, $e$, and operated simultaneously by a single motor, E'. This portion of the invention, however, is made the subject-matter of a separate application for ventilation.

Figure 10:
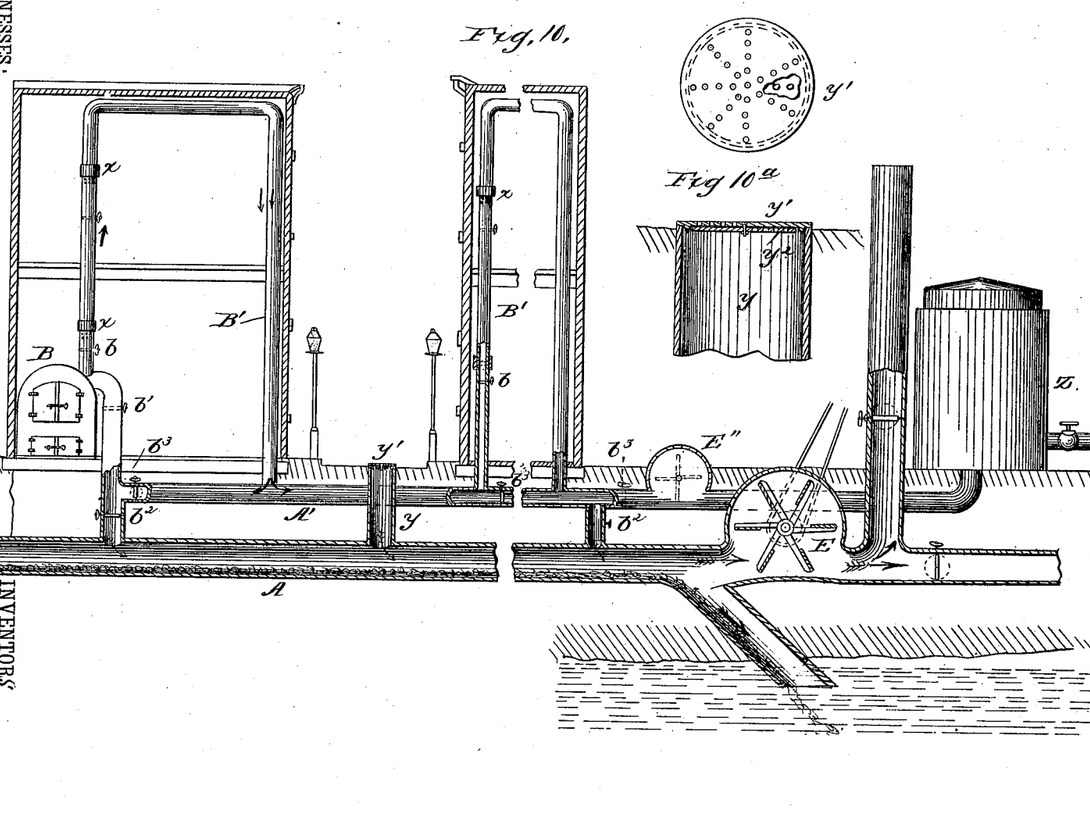
Fig. 10 is a sectional elevation, showing the arrangement of furnace and house pipes, the auxiliary and main conduits, means for saving and storing nitrogen gas, and the submerged sewer-outlet, the gases, &c., being propelled farther on for treatment or discharge. Fig. $10^a$ are details of the man-hole cover.

In Fig. 10 the same idea is carried out in a different manner. A represents the sewer; A', the auxiliary conduit, and B a furnace. By closing the cocks $b'$ $b^3$ near the furnace the products of combustion are carried upward and utilized in any desired manner, and led into the conduit A', from whence they may be drawn into the sewer A, or through an adjacent building, and then into the sewer. By this construction and arrangement the nitrogen gas resulting from the combustion may be forced into the tank Z by the auxiliary fan E'', where it is stored for any appropriate use or service. The sewer A is provided with a downwardly-inclined branch, and its outlet for sewage is submerged in water, and the gases, vapors, &c., being forced onward by the fan E, may be burned, as before mentioned, or otherwise disposed of. In this figure, $y$ represents a man hole having a perforated cover, $y'$, a perforated disk, $y^2$, serving as a register to control the amount of dilution, if any.

By the construction shown in Figs. 2 and 7 the escape of exhaust-steam is directed to the submerged mouth of the sewer or main, and effectually churns and agitates the sewage and water at that point, while the gases are forced farther along for other treatment.

Figure 11:
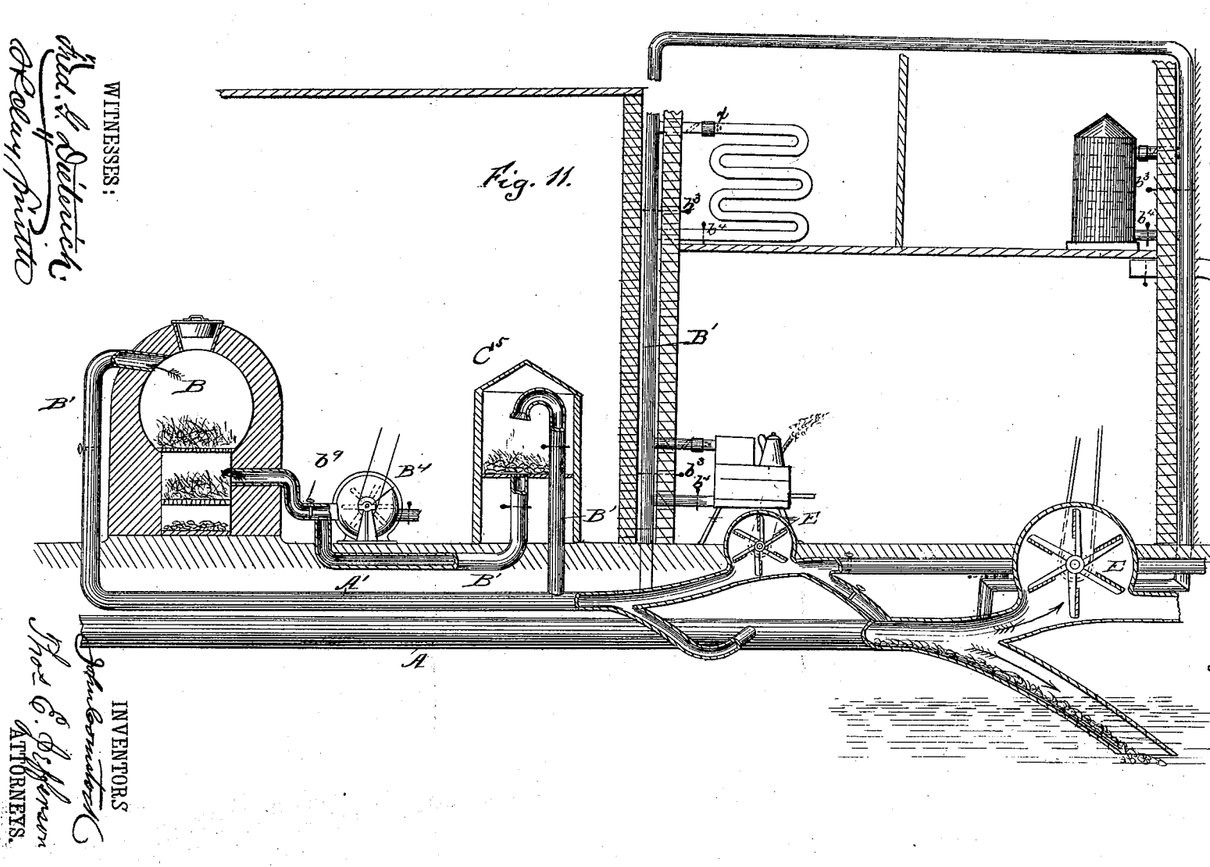
Fig. 11 shows a different arrangement for utilization of heat in relation to a blast-furnace.

Referring to Fig. 11, A represents the sewer; A', the drain connection or auxiliary main; B, a blast-furnace, and B' the connecting-pipe with other devices. In this arrangement a blast-fan, $B^4$, acts in connection with the power fan or fans E to create a draft—the former to push and the latter to draw the products of combustion through and away from the blast-furnace. By means of a cock, $b^9$, the force, or a portion of it, may be turned from said furnace to a forge, C⁵, the products of combustion from which are gathered up by the flaring-mouthed pipe B' and conducted to the conduit A'. This conduit A' connects with the sewer at any desired point to carry off any débris which may collect. The forge is of little importance except to show one of the uses to which the invention may be diverted, as we place more importance upon the utilization of the heat, &c., arising from the consumption of fuel in the blast-furnace. As shown, the gases are carried along through any one or more of a series of rooms in a building or buildings and utilized for heating or other purposes, the poisonous gases, smoke, &c., carried to the furnace for burning, and sewage discharged from the submerged outlet of the sewer.

When it is not desired to employ the heat in the buildings, &c., as in warm weather, a greater volume of cold air may be admitted through the forge-pipe B, and the draft may be incited by a separate fan belted to the shaft of the fan B⁴.

By the arrangement herein set forth the products of combustion, smoke, &c., gas, soot, and commingled sewer-gas, &c., are burned as fuel in the furnace G, the products of combustion from which may be led to the point where the exhaust-steam churns the sewage and water.

By this system of utilizing waste heat entire districts and even cities may be sufficiently heated, while the objectionable features due to a multiplicity of fires may be removed.

An important feature of our invention in the utilization of heat lies in the means for inducing and creating a more perfect combustion in the fuel-consuming device. This feature is shown in Fig. 11 in relation to a blast-furnace; but the system is equally applicable and efficient in other similar devices. By referring to said figure it will be seen that a draft-inciting means is employed upon either side of the furnace—the one, B⁴, to force air properly charged with oxygen to the flame, and the other, E, to prevent clogging by quickly and continuously drawing off the generated products of combustion. The latter or suction device may be located wherever desired, and will serve its purpose in thus assisting combustion whether the intermediate heat-utilizing devices are employed or not. By this means of drawing off the generated products of combustion a greater quantity of heat is or may be utilized in the furnace in the melting of ore, or in other arts or uses, the line of travel of the said heat being made more or less tortuous.

In some conditions and under some circumstances it may be desirable to utilize the heat in one or more apartments of a building only, to cut it off from the building entire, or to give varying heat to different apartments of the same building.

We also provide for such contingencies as shown in Fig. 11, where the house-pipe B' leads from the heat-conduit A' between the walls of a building, suitable pipe-connections having registers and ventilators and proper cut-offs allowing the gradation and manipulation of the flow of heat at will.

Where no heat is required in any given apartment, it may be cut off, and, if required, may be modified to suit different apartments, as occasion may require, thereby absolutely regulating the temperature of each room separately, proper air-inlets to admit fresh air being provided, as seen at x in Fig. 11.

By this or similar system, by employing sufficient heat, blocks of buildings, districts, or entire cities can be heated collectively or in sections at a great economy of both expense and trouble.

By means of this invention not only are the fires more easily and quickly kindled, the entire heat utilized, and smoke, gas, &c., entirely eliminated, but the temperature of different apartments may be varied and the degree of heat be adjusted with great nicety, enabling the householder to overcome extremes of temperature as well as to modify the effects of sudden changes of weather at will.

In large manufactories a large percentage of heat is absolutely wasted—ordinarily more than one-half. By this invention this wasted heat may be diverted to the use of the adjacent employés, and others, for warming and cooking purposes, the year round—very advantageously in winter, while in summer the heat is removed quickly from the vicinity. The soot, smoke, &c., which make cleanliness impossible, are eliminated, which enables the manufacturing-towns to be more desirable for residences, thus enhancing the value of the property.

By this system noxious and disagreeable gases arising in the practice of some of the various arts are removed quickly away for utilization in connection with the poisonous sewer-gas.

According to this invention, the sewer or other conduit is made to so far approximate an air-tight condition that the partial vacuum created therein will induce a proper draft from the entire series of fuel-consuming devices to which it is connected, allowing the heat, &c., to be conveyed from one district to another until the system of utilization accommodates an entire city, the mechanical means of course being modified and adjusted to meet this result.

Any number of engines and fans may be used as required at different points in the city, and modifications may be employed in details of construction without departing from the principle or sacrificing any of the advantages of our invention.

We have shown several of the uses and advantages of the system; but we do not wish to be confined to the precise mechanisms set forth—as, for instance, the fan in its construction, the motive power, the kind of heat-generating and class of heat-utilizing devices, and the direction and travel of the connecting-pipe may be varied as occasion may suggest.

The importance of employing the sewer system as a means for the elimination of soot, smoke, &c., arising from combustion of fuel has incited suggestions of certain English scientists as embodied in certain publications; but heretofore in no instance has positive mechanical force been applied as a means for creating the necessary draft required for the removal of the products of combustion through the sewer, or for the more perfect utilization of all the heat contained therein.

It will be understood that the fuel-consuming devices serve as means whereby the system of ventilation of buildings is carried on as the apartments are ventilated into the devices, and such devices are ventilated into the sewer, and means for adjusting the ventilation may be provided for such heating devices and connected with the flues thereof, whereby the complete ventilation of the apartments is under the absolute control of the occupant.

The products of combustion, through the system of ventilation from apartments and by other means, are diluted and mixed with air properly charged with oxygen, thus insuring the more complete combustion of such products when reburned in an auxiliary furnace.

One prime object of the invention being the utilization of heat at any point during its transit through the sewer or other conductor, the means for ventilating the apartments into the heating devices in its importance will be apparent.

A patent has recently been granted us for an improved system of ventilation wherein measurably similar apparatus is employed; but the present application, being a separate invention, is not designed to cover any portion of such patented invention.

In employing our system it may be necessary in some places to divide a city into working sections, and employ in connection with a sewer or main a positive suction apparatus in combination with a chimney within the limits of the inhabited portion of a district, (see Fig. 6;) but it will be understood that where we use a chimney to convey mingled gases from the main or sewer it is primarily for the purpose of removing the offensive products to a distance, and it is either an auxiliary to or an equivalent for the sewer or main extending beyond the inhabited portion of or limit of the district in which the system is utilized.

The effect of a chimney in producing draft is a secondary benefit, as for the purpose of creating sufficient air-current within the sewer or main we propose a mechanical means of exhausting—such as a fan, pump, or other mechanical suction device applied to the sewer or other main, or in combination with a chimney—one essential feature of our invention being to so locate the suction device as to draw refuse products of combustion, gases, &c., from rather than force them toward the buildings using our system.

Under date of June 13, 1882, we have been granted Letters Patent No. 259,631, wherein we claim, viz:

"In ventilating the sewers of a city or district and the drains of a building or buildings, the method of utilizing the products of combustion of furnaces, stoves, &c., as an aid to the purification of the gases in the sewer and drains previous to their elimination from the same, which consists in connecting the flues of the heating apparatus to said drains and sewers and inducing a powerful mechanically-produced draft of air within said sewer, &c., whereby the products of combustion are commingled with the noxious gases and vapors, and are finally discharged at a point beyond the inhabited portions of the city or district, as set forth."

Also, "in the art of ventilation, the method of utilizing the sewers of a city as main ventilating-conduits, whereby the discharge of the sewage is accelerated and the sewers rendered more efficient in their action, which consists in connecting the sewers by suitable branches to the buildings to be ventilated, inducing a powerful mechanically-produced draft toward the exits of the sewers, and automatically preventing the backflow of air-currents into the sewers and drains, as set forth."

Also, "in ventilating the sewers of a city or district and the drains of buildings, the method of utilizing the surplus heat of the furnaces or other heating apparatus of the buildings located within a defined district to prevent the sewer contents from freezing, and thus interfering with effective ventilation, which consists in connecting the heating apparatus with the sewers, mechanically inducing a powerful draft of air toward the exit of the sewers, and regulating the discharge from the heating apparatus to the sewers, as set forth."

Also, "in the art of ventilation, the combination, with a conduit rendered approximately air-tight, and means for inciting therein a powerful and continuous draft in the direction of its exit, of branches connecting said conduits with the apartments of buildings, and means whereby the backflow of sewer-gas from said conduit is automatically provided against, as set forth."

Also, "in the art of ventilation, a sewer-main having ventilating-connections through furnaces, stoves, &c., and an auxiliary main having ventilating-connections with apartments and buildings, combined with means for creating a powerful draft in each main in the direction of its outlet, and a motor common to both said draft-inciting means, as set forth."

The said Patent No. 259,631 also grants us other claims bearing more or less upon the subject-matter of this invention. We also set forth in said patent a main having end submerged in water, furnaces, heat-using apparatus, gas-washer, and other devices not therein claimed, as in the combinations herein specified.

In our application for improvement in sewers filed May 27, 1882, and serial number 62,710, we also claim—

"An approximately air-tight sewer having sealed outlet and inlets with means for regulating the inflow of air, combined with means for creating in said sewer a current of air in the direction of the sealed outlet, as set forth."

Also, "an approximately air-tight sewer having graduated inlets and connections with apartments of buildings and suitable inlets from stoves, &c., combined with means for creating a draft in said sewer in the direction of its sealed outlet, as set forth."

Having thus fully described our invention, what we claim, and desire to secure by Letters Patent, is—

1. The herein-described method of utilizing all the heat arising from the combustion of fuel, and eliminating the injurious products, consisting in connecting the heat-generating device or devices with a sewer or other main, and in forcing such injurious products through such sewer or main away from the inhabitants by positive mechanical means, and through a series of heat-utilizing devices, such mechanical means being employed in connection with a chimney, or with the sewer or main, substantially as specified.

2. The herein-described method of utilizing all the heat arising from the combustion of fuel, and in conveying away the injurious portion of the products, consisting in connecting the fuel-consuming devices with an ordinary sewer or main, and in creating a powerful draft in such sewer or main by positive mechanical means, and automatically preventing backflow of such products, as set forth.

3. The process of utilizing all the products of combustion, consisting in conducting the same through a series of heat-utilizing devices, substantially as described, employing the smoke, gas, soot, &c., as fuel for a motor which induces a draft from the furnace or stove to the the sewer, and using the surplus heat to prevent freezing of sewage, as specified.

4. The method herein described for utilizing all the products of combustion, and of employing the smoke, gas, soot, &c., and the sewer-gas as fuel for a motor which induces a draft from the furnace to the sewer, and of using the heat to prevent freezing of sewage, consisting in conveying the products of combustion to the sewer and forcing them through a furnace connected to such sewer by positive mechanical means, as specified.

5. The combination of a furnace with a main, and mechanical suction device for inciting a draft therein, and branches connecting said main with stoves, &c., provided with air-inlets, whereby the air may be admitted to mingle with the products of combustion for the purpose of creating more perfect combustion in said stoves, &c., as set forth.

6. The method herein described for creating a free and powerful draft in stoves, furnaces, and the like, of removing the smoke, gas, soot, &c., arising therefrom, and of utilizing the surplus heat, consisting in connecting such devices with the sewer or other main, and in mechanically creating therein a powerful draft in the direction of the exit to conduct the unutilized and injurious products through the sewer or main and away, and automatically preventing a backflow of air, gas, &c., within the sewer or main, as set forth.

7. The combination, with the sewer or other main, heating devices, connections through which the smoke, gas, soot, &c., are discharged into said sewer or main, and the suction apparatus, substantially as described, of the sewer-outlet submerged below the surface of the water, whereby the said gases, &c., are subjected to the action of water and cleansed, as herein specified.

8. The combination, substantially as described, of a system of sewer or other mains, a powerful suction apparatus for producing a partial vacuum therein, means for preventing backflow therein, and stoves, furnaces, and the like, for the combustion of fuel, connected to said mains, whereby the products of combustion from such stoves, &c., will be discharged first into said main, and thence removed away from the people, as specified.

9. In combination with a furnace and a sewer or other conduit, the furnace G for consuming the commingled gases, and the suction apparatus, as set forth.

10. The combination, with an approximately air-tight sewer or other main, means for preventing backflow therein, and means for creating therein a powerful draft in the direction of its outlet, of a furnace or other fuel-consuming apparatus, and a pipe or flue connecting said furnace with the said sewer, said pipe also connecting with rooms, tanks, ovens, stoves, or other fuel-utilizing devices located between the furnace and sewer, for the purpose of utilizing all the heat generated and removing away the injurious products, as set forth.

11. The combination, with a sewer or other main, mechanical means for creating therein a powerful draft, and means for preventing backflow, of a stove, furnace, or other fuel-burning device, and a pipe connecting the same with said sewer or main, said pipe leading through or connecting with tanks, ovens, or apartments in other buildings upon either side of a street or thoroughfare, for the purpose of utilizing to advantage all the heat arising from combustion of fuel in said furnace, &c., and removing the injurious gases and noxious products away from the inhabitants, as set forth.

12. The combination, with a sewer or other main, and means for inducing therein a positive and powerful draft in the direction of its outlet, of stoves, furnaces, &c., and flues for connecting said stoves, &c., with said main, such flues being provided with means for regulating the amount of draft, and means for preventing a backflow of the products of combustion, as set forth.

13. The suction apparatus E, furnace B, and house-pipe B', connecting said furnace with the sewer or other main in which the draft is created, combined with the intermediate heat-utilizing devices, arranged as shown, and connected with said pipe B', as set forth.

14. The suction apparatus E, combined with the house-pipe B', furnace B, heating devices C C' C², &c., and cocks $b^3$ $b^4$ $b^5$, whereby any one or more of the devices may be connected with the pipe B' at will, as set forth.

15. The conduit A and draft-inciting means E, combined with the furnace B, the house-pipe B', having ventilators $x$, and with the series of heating devices C C' C², &c., each having a governing-register, as specified.

16. The furnace B and house-pipe B', having cocks $b$ $b'$ $b^2$, combined with the conduit, and with mechanical means E for inciting a draft therein, the said cocks serving to deflect the products of combustion arising from the furnace B in either of three directions at will, as set forth.

17. The combination of the furnace B and house-pipe B', connecting the same with the conduit, the ventilators $x$, and heating devices C C', &c., arranged upon both sides of a street, and governing cocks, with the fan E and expansible joint D, the whole adapted to serve as and for the purposes set forth.

18. The combination of furnaces, stoves, &c., and connecting-pipes leading to conduits or mains, having a separate fan for each conduit hung upon a single shaft, and operated by a single motor, E', whereby the products of combustion are utilized to disinfect and purify the sewer-gas, and the surplus heat utilized to prevent the sewer from freezing, as set forth.

19. The combination of the conduit and means for inciting a powerful draft therein with the furnace B, house-pipe B', connecting-flue B², and damper $b^8$, and with the check-valve $b^7$, adapted to automatically prevent a backflow of smoke, &c., as set forth.

20. The combination of the furnace, sewer, and connections between the two with the fan E, steam-generating furnace G, and engine, whereby the unconsumed products of combustion from said furnace B are utilized as fuel to generate the steam which is the motor used for impelling the draft, as set forth.

21. The combination of the furnace B, house-pipe B', with intermediate section, $x$, perforated, as shown, slide B², the check-valves $b^7$, and means for graduating the draft at will, with the conduit and fan E, as set forth, and shown in Figs. 8 and 9.

22. The combination, with the sewer A, having submerged outlet for discharge of sewage, furnace B, and connections, of the fan E and means for conveying the poisonous gases away for discharge or further treatment, as described.

23. The combination of the sewer or conduit and fan with the branch A², leading to the interior of the perforated cylinder I', the water-inlet pipe I, leading to the space between said cylinder and the flue, and the discharge-pipe $i$, whereby the ascending smoke and gases are subjected to falling spray and washed, as set forth.

24. The combination of fuel-consuming devices, the sewer having submerged exit, the connecting-pipes between the furnaces and said sewer, and the fan, whereby the products of combustion not previously utilized are discharged beneath the surface of the water, as set forth.

25. In connection with the system of utilizing products of combustion, the engine E', fans E E², sewer A, having submerged outlet, and the exhaust-steam connections leading to the point of said sewer-discharge to churn and agitate the water at that point, as specified.

26. The combination of the sewer having submerged outlet, the fuel-consuming devices, and connections with the fan E, the furnace G, the conductor leading the products of combustion from said furnace to the point of sewage-discharge, and the exhaust-steam connections for churning both sewage and products with the water, as set forth.

27. In the system of utilizing heat herein described, a fuel-consuming furnace combined with a blast fan, a sewer or other main, a powerful mechanical suction apparatus, and with a series of heat-utilizing devices between such suction apparatus and furnace, as specified.

28. The combination of the furnace B, the blast-fan B⁴, and mechanical suction apparatus E with the series of intermediate heat-utilizing devices and means for automatically preventing backflow therein, as shown and set forth.

29. In promoting, perfecting, and utilizing combustion, a fuel-consuming device combined with a fan or similar device for feeding air to the flame, a positive mechanical suction device for drawing off the generated products of combustion, the sewer or other main, and a pipe, flue, or other means for connecting them, and means for preventing backflow of the products of combustion, &c., as specified.

30. In the system of utilizing heat herein described, a fuel-consuming furnace combined with a blast-fan and a powerful mechanical suction apparatus, and means for preventing backflow of products of combustion, substantially as shown and set forth.

31. In the system of the utilization of heat herein described, the house-pipe B', located outside the apartments of a building, connections therewith, and cut-offs arranged within such apartments, and controlling and ventilating devices, combined with the conduit A' and draft-inciting means, whereby the temperature of either or all of a series of apartments may be regulated at will or the heat be entirely cut off, as set forth, and as shown in Fig. 11.

32. The combination of the furnace B and sewer A and auxiliary furnace G with blast-fan B⁴ and positive suction apparatus E and intermediate heat-utilizing devices, as set forth.

33. The combination of the sewer A, furnace

B, and auxiliary furnace G with the fan E, substantially as set forth.

34. The combination of the furnace B, blast-fan B⁴, mechanical suction apparatus E, and the sewer A, substantially as shown.

35. The combination of furnace B, sewer A, branch A', fan E, pipe b', and stoves, &c., for the purpose and substantially as set forth.

36. The combination of a furnace with a main, and mechanical suction device for inciting a draft therein, and branches connecting said main with stoves, &c., provided with air-inlets, whereby the air may be admitted to mingle with the products of combustion for the purpose of creating more perfect combustion, and with means for preventing backflow of smoke, gases, &c., as set forth.

37. The method of utilizing the heat generated in furnaces, stoves, and the like by connecting said furnaces, stoves, &c., to a sewer or other main by a suitable conduit, and inciting in said sewer or main a powerful mechanical draft toward its exit, said heat-generating devices, conduits, and connections being provided with graduated means for admitting air to the products of combustion for the purpose of obtaining more perfect combustion, as set forth.

38. The method of utilizing the heat generated in furnaces, stoves, and the like by connecting said furnaces, stoves, &c., to a sewer or other main by a suitable conduit, and inciting in said sewer or main a powerful mechanical draft toward its exit, said heat-generating devices, conduits, and connections being provided with graduated means for admitting air to the products of combustion, and means for automatically preventing backflow, for the purpose of obtaining more perfect combustion, as set forth.

In testimony whereof we affix our signatures in presence of two witnesses.

JOHN COMSTOCK.
THOMAS E. JEFFERSON.

Witnesses:
H. CLAY SMITH,
J. C. LATHROP.